Aug. 14, 1923.

F. G. WITHROW ET AL 1,464,794

DETACHABLE ENGINE CRANK

Filed Oct. 24, 1921

Inventors
Floyd G. Withrow
Alvin M. Walker
By Frank E. Leverance, Jr.
Attorney.

Patented Aug. 14, 1923.

1,464,794

UNITED STATES PATENT OFFICE.

FLOYD G. WITHROW AND ALVIN M. WALKER, OF GRAND RAPIDS, MICHIGAN.

DETACHABLE ENGINE CRANK.

Application filed October 24, 1921. Serial No. 509,776.

*To all whom it may concern:*

Be it known that we, FLOYD G. WITHROW and ALVIN M. WALKER, citizens of the United States of America, residing at Grand Rapids, in the county of Kent and State of Michigan, have invented certain new and useful Improvements in Detachable Engine Cranks; and we do hereby declare the following to be a full, clear, and exact description of the invention, such as will enable others skilled in the art to which it appertains to make and use the same.

This invention relates to a construction of detachable engine crank, particularly for engines of motor vehicles. This invention is concerned with an accessory device which is adapted to be substituted for the regular permanently connected engine crank used on Ford motor vehicles, and by means of which the crank may be detached when not used, thereby eliminating the necessity of having the crank dangle from the front of the vehicle. It is a primary object and purpose of the invention to construct a device by means of which the ends stated may be attained in a particularly simple and economical manner. It is a further object of the invention to cover the projecting end of the auxiliary shaft to which the handle is adapted to be detachably connected with a covering cap so that a very neat appearance is presented during the time that the handle is not used. Various other objects and purposes than those stated will appear fully and in detail as understanding of the invention is had from the following description, taken in connection with the accompanying drawing, in which, Fig. 1 is a partial vertical section and side elevation, illustrating the application of our invention to a motor vehicle engine.

Like reference characters refer to like parts in the different figures of the drawing.

Figure 1:
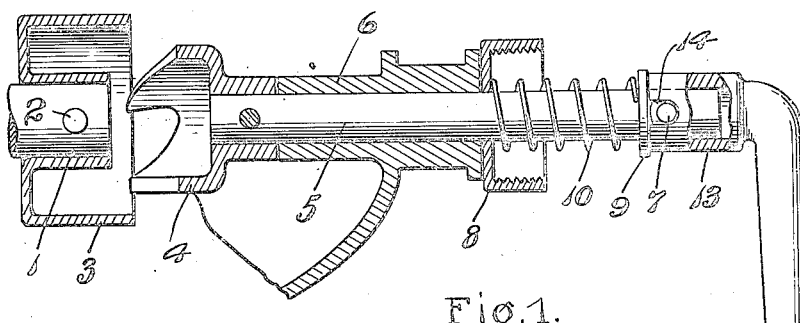

The front end of the crank shaft of the engine, indicated at 1, has a pin 2 passing therethrough, its ends extending a distance beyond the sides of the shaft. The pulley 3 is for the purpose of driving the fan through use of a suitable belt. This is the well known construction at the front end of the crank shaft of Ford motor vehicles.

Directly in front of the front end of shaft 1, a clutch member 4 adapted to engage with the projecting ends of pin 2 is located, being carried on the rear end of an auxiliary shaft 5 mounted in a sleeve 6 in alinement with the axis of rotation of the crank shaft. Sleeve 6 is of relatively short length and the auxiliary shaft 5 extends a distance in front of the front end thereof and has a pin 7 passing therethrough a short distance back of the front end of said auxiliary shaft, the ends of the pin also extending beyond the sides of the shaft. An interiorly threaded cup-like member 8 is passed over the shaft 5 and is brought against the front end of the sleeve 6 and a washer 9 is placed around the shaft immediately back of the pin 7, a coiled compression spring 10 around shaft 5 between the member 8 and washer 9 forcing the same against the sleeve and pin 9, respectively. A cap 11, exteriorly threaded at its open end for connection to the member 8 is placed over the projecting end of the shaft 5 and the pin 7, washer 9 and spring 10 thereon to cover the same except at the times that the crank is to be used.

The crank 12 is of usual form, being provided with a sleeve end 13 which is adapted to freely pass over the front end of the shaft 5, said part 13 having notches 14 in opposite sides for the reception of the end portions of pin 7. It is evident that with the crank thus attached, on pressing inward on the crank, spring 10 is compressed and the clutch 4 brought into connection with pin 2 whereupon the crank shaft may be rotated for the starting of the engine. This is necessary only when the starter for the engine does not work and will not occur very frequently.

After the engine is started, the cap 11 may be attached by threading it into the member 8. When the engine may be started by the starter, it is not necessary to remove the cap which serves as a protector for the spring and at the same time adds to the appearance. The cap is easily applied or removed whenever necessary. While we have shown the member 8 as interiorly threaded and the cap as exteriorly threaded, it is obvious that this arrangement of threading may be reversed with an attainment of the same results.

Figure 3:
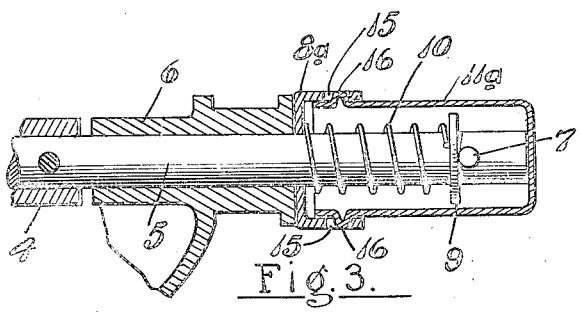
Fig. 3 is a view similar to Fig. 2, showing a modified form or method of attaching the covering cap.
Figure 4:
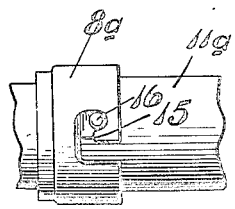
Fig. 4 is a fragmentary side elevation illustrating the means used for connecting such cap.

Other ways of attaching the cap may be resorted to and we have shown one in Figs. 3 and 4, wherein the member 8ª, taking the place of the member 8 of the first construction has bayonet slots 15 cut in opposite sides and the cap 11ª, taking the place of cap 11 is formed with oppositely extending pins 16 which are designed to enter the slots 15 and thereby connect the member 8ª and cap 11ª together. In attaching the cap, its outer end presses against the end of shaft 5 and forces it inwardly slightly so that when the pins 16 have been entered into slots 15 and the cap turned to one side and then released, the spring acting through shaft 5 against the cap draws the pins 16 into the recesses made therefor in the lateral branches of the slots 15 as shown in Fig. 4, making a connection which prevents accidental disconnection of the cap.

Figure 2:
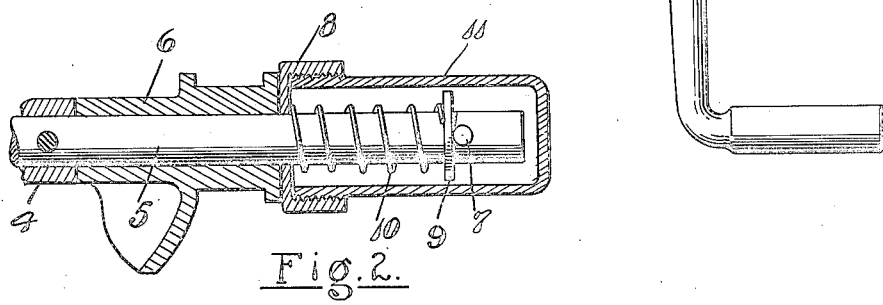
Fig. 2 is a vertical section showing the crank removed and the covering cap applied.
Figure 5:
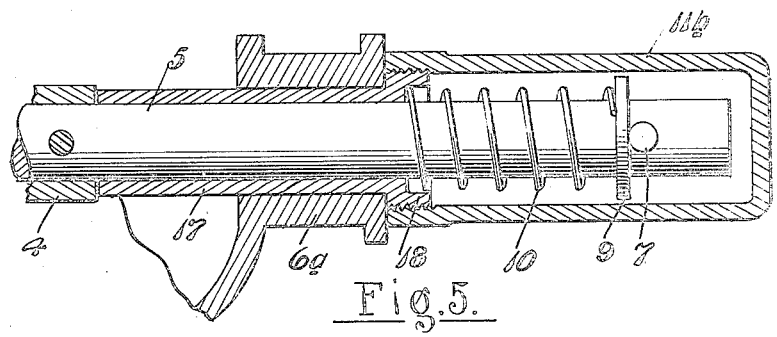
Fig. 5 is a vertical section of a modified form.
Figure 6:
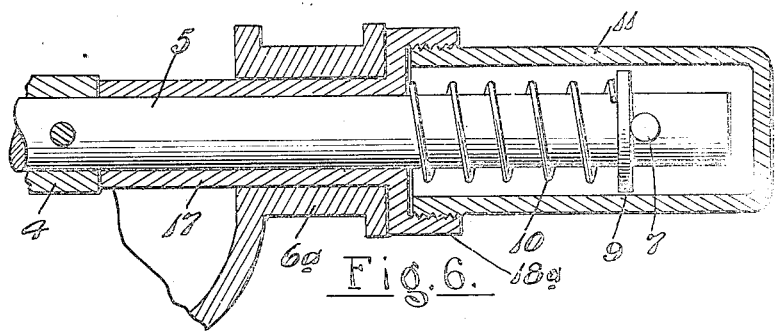
Fig. 6 is a vertical section of a modified form.
Figure 7:
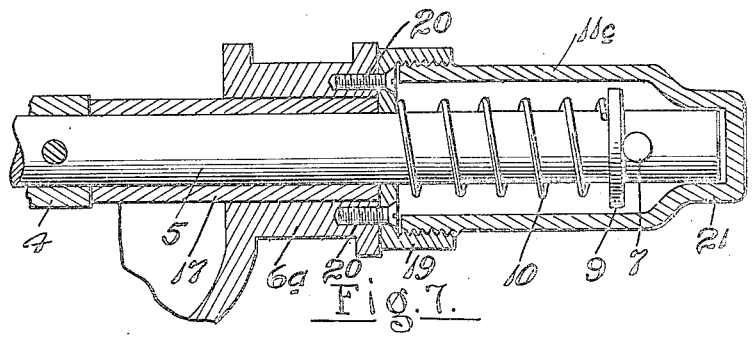
Fig. 7 is a vertical section of a modified form.

The invention may be embodied in different manners, and we have illustrated some of the same in Figs. 5, 6 and 7. In Fig. 5, the sleeve 6ª taking the place of the sleeve 6 is shorter and an elongated bushing 17 passes therethrough in which the shaft 5 is rotatably mounted. The front end of the bushing is enlarged and exteriorly threaded, making a head 18 on to which the cap 11ᵇ interiorly threaded at its open end is placed. In Fig. 6, the construction is the same except that the head 18ª is larger and is interiorly bored and threaded, as indicated at 18ª, the cap 11 attaching thereto being the same as that shown in Fig. 2. In Fig. 7, the bushing 17 terminates directly at the end of the sleeve 6ª and the cup-like member 19, similar in all respects to the member 8, first described, is permanently secured to the sleeve 6ª, screws 20, or any other suitable attaching means being used. The cap 11ᶜ threads into the member 19 and at its outer end is reduced in size as indicated at 21 so that the projecting end of the auxiliary shaft 5 fits somewhat closely therein. This is of value in preventing rattling due to loose play of the auxiliary shaft 5 under the effects of the running of the vehicle and is a feature of merit making the construction of cap shown in Fig. 7 a preferred one.

Many other variations in constructive detail may be resorted to without departing from the invention which is defined in the appended claim. Accordingly, we consider ourselves entitled to all such constructions as come within the scope of the claim.

We claim:

In combination, an engine crank shaft, a sleeve located in front of the front end of said crank shaft, a bushing located in and lengthwise of the sleeve, an auxiliary shaft rotatably mounted in the bushing and extending a distance back of and in front of the sleeve, interengaging means on the crank and auxiliary shafts at their adjacent ends whereby the same may be detachably connected together, a member permanently secured on the front end of the sleeve, means at the front end of the auxiliary shaft with which a crank may have detachable connection, spring means acting on the auxiliary shaft to move the same forward, and a cap placed over the front end of the auxiliary shaft and detachably connected to said member, said cap at its forward closed end closely engaging the front end of the auxiliary shaft.

In testimony whereof we affix our signatures.

FLOYD G. WITHROW.
ALVIN M. WALKER.